United States Patent [19]
Chen et al.

[11] Patent Number: 5,999,958
[45] Date of Patent: Dec. 7, 1999

[54] DEVICE FOR COMPUTING DISCRETE COSINE TRANSFORM AND INVERSE DISCRETE COSINE TRANSFORM

[75] Inventors: Chingson Chen, Ping Jen; Chein-Wei Jen, Hsinchu, both of Taiwan

[73] Assignee: National Science Council, Taipei, Taiwan

[21] Appl. No.: 08/636,971

[22] Filed: Apr. 24, 1996

[51] Int. Cl.⁶ .................................................. G06F 17/14
[52] U.S. Cl. ............................................................ 708/402
[58] Field of Search ......................... 364/725.03; 708/402

[56] References Cited

U.S. PATENT DOCUMENTS

| | | | |
|---|---|---|---|
| 4,791,598 | 12/1988 | Liou et al. | 364/725.03 |
| 5,285,402 | 2/1994 | Keith | 364/725.03 |
| 5,357,453 | 10/1994 | Kim et al. | 364/725.03 |
| 5,598,361 | 1/1997 | Nagamatsu | 364/725.03 |
| 5,668,748 | 9/1997 | Huang | 364/725.03 |

*Primary Examiner*—David H. Malzahn
*Attorney, Agent, or Firm*—Fish & Richardson P.C.

[57] ABSTRACT

Devices for computing discrete cosine transform, inverse discrete cosine transform or reduced ones, which require fewer transistors and less chip area, and which operate at a higher speed than those of the prior art. For example, the DCT/IDCT processor in the present invention essentially includes a matrix summation device and a plurality of shift adders. The matrix summation device computes a plurality of binary vectors from bits of an input vector, respectively for each term of an output vector. The shift-adding means respectively compute the terms of the output vector by sequentially left-shifting and adding the corresponding binary vectors.

19 Claims, 9 Drawing Sheets

DEVICE FOR COMPUTING DISCRETE COSINE TRANSFORM AND INVERSE DISCRETE COSINE TRANSFORM

BACKGROUND OF THE INVENTION

1. Field of the Invention

The present invention in general relates to devices for computing discrete cosine transform (hereafter called DCT) and inverse discrete cosine transform (hereafter called IDCT). More specifically, the present invention relates to DCT/IDCT processors based on adders, wherein these processors require less transistors, less estimated area and operate at higher speed than those of the prior art.

2. Description of Related Arts

The discrete cosine transform (DCT) has been adopted by many international standardizations of image processing and digital communication, such as MPEG1, MPEG2, and ISO9660. Since these standardizations are frequently applied to ISDN (Integrated Service Digital Network), video telephones, interactive television and high-definition television systems, reducing the fabrication cost of DCT converters and speeding up their convertion process will be a critical factor determining the success of a product.

DCT and IDCT are the inverse of each other. In addition, the transformation schemes of both are very similar. One-dimensional DCT or IDCT can be conceptionally regarded as a matrix. For example, 8-point DCT and 8-point IDCT can be expressed as:

$$U = \Phi V = \begin{bmatrix} \phi_{00} & \cdots & \phi_{07} \\ \vdots & \ddots & \vdots \\ \phi_{70} & \cdots & \phi_{77} \end{bmatrix} \times V \quad (1)$$

where $\phi_{mn} =$ $$\phi_{mn} = C_m \cos \frac{(2n+1)m\pi}{16},$$

$0 \leq m, n \leq 7$ $$C_m = \begin{cases} 1/\sqrt{8}, & m = 0 \\ 2/\sqrt{8}, & m = 1\text{-}7 \end{cases}$$

and $$V = \Phi^T U \quad (2)$$

where $\Phi^T$ is the transpose matrix of $\Phi$, respectively. In equations (1) and (2), U and V represent 8×1 vectors, and $\Phi$ and $\Phi^T$ represent 8×8 matrices.

In addition, the computation of DCT and IDCT respectively formulated in equations (1) and (2) can be simplified by the "decimation in frequency" technique. The reduced DCT derived from equation (1) can be expressed as:

$$\begin{bmatrix} U_0 \\ U_2 \\ U_4 \\ U_6 \end{bmatrix} = \begin{bmatrix} \cos 4\theta & \cos 4\theta & \cos 4\theta & \cos 4\theta \\ \cos 2\theta & \cos 6\theta & \cos 10\theta & \cos 14\theta \\ \cos 4\theta & \cos 12\theta & \cos 20\theta & \cos 28\theta \\ \cos 6\theta & \cos 18\theta & \cos 30\theta & \cos 42\theta \end{bmatrix} \begin{bmatrix} V_0 + V_7 \\ V_1 + V_6 \\ V_2 + V_5 \\ V_3 + V_4 \end{bmatrix} \quad (3)$$

$U' = \Phi' V'$ $$\begin{bmatrix} U_1 \\ U_3 \\ U_5 \\ U_7 \end{bmatrix} = \begin{bmatrix} \cos \theta & \cos 3\theta & \cos 5\theta & \cos 7\theta \\ \cos 3\theta & \cos 9\theta & \cos 15\theta & \cos 21\theta \\ \cos 5\theta & \cos 15\theta & \cos 25\theta & \cos 35\theta \\ \cos 7\theta & \cos 21\theta & \cos 35\theta & \cos 49\theta \end{bmatrix} \begin{bmatrix} V_0 - V_7 \\ V_1 - V_6 \\ V_2 - V_5 \\ V_3 - V_4 \end{bmatrix} \quad (4)$$

$U'' = \Phi'' V''$, where $U_i$ represents a term of vector U, i=0 to 7; $V_j$ represents a term of vector V, j=0 to 7; and $\theta=\pi/16$. In the same way, the reduced IDCT derived from equation (2) can be expressed as:

$$V' = (\Phi')^{-1} U' \quad (5)$$

$$V'' = (\Phi'')^{-1} U'' \quad (6)$$

Two-dimensional DCT or IDCT can be obtained by directly applying the cascaded one-dimensional DCT or IDCT. Accordingly, equation (1) or equations (3) and (4) can be used for calculating DCT, while equation (2) or equations (5) and (6) can be used for calculating IDCT.

There are a lot of techniques to implement DCT and IDCT processors. For example, U.S. Pat. Nos. 4,791,598 and 4,831,574, and R.O.C. Patent No. 190220 disclose ROM-based and distributed architectures for the DCT/IDCT processor. In addition, U.S. Pat. Nos. 4,837,724, 5,117,381, 5,197,021, 5,249,146 and 5,257,213, and R.O.C. Patent No. 211610 and 219420 discloses architectures of combined adders and multipliers for the DCT/IDCT processor. Furthermore, U.S. Pat. No. 5,053,985 discloses an architecture based on central logic operational units, and U.S. Pat. No. 5,181,183 discloses a combinational logic circuit to simplify the operation. In the following, ROM-based DCT and IDCT processors are described in detail to illustrate the prior art.

Distributed Arithmetic (DA) is often used to calculate the inner product of two vectors when one vector is known and fixed. Matrix multiplication in equations (1) to (6) can be regarded as several inner products of vectors. For a generalized N-point system, the i-th term $U_i$ of vector U in equation (1) can be expressed as:

$$U_i = \sum_{j=0}^{N-1} V_j \phi_{ij} \quad (7)$$

where $\phi_{ij}$ is the term in the i-th row and the j-th column of transform matrix $\Phi$; V is the j-th term of vector V; and $0 \leq i,j \leq N-1$. The value of transform matrix term $\Phi_{ij}$ depends on the definition of the N-point system and is known. In addition, vector term $V_j$ is in the form of a series of binary bits and can be expressed as:

$$V_j = \sum_{k=P}^{M} V_{j(k)} 2^k \quad (8)$$

where P and M are nonzero integers and $P \leq M$. $V_{j(k)}$ is the coefficient of the $2^k$ power term of vector $V_j$, ONE or ZERO.

Therefore, according to equations (7) and (8), vector term $U_i$ can be calculated by:

$$U_i = \sum_{j=0}^{N-1} \left( \sum_{k=P}^{M} V_{j(k)} 2^k \right) \phi_{ij} = \sum_{k=P}^{M} \sum_{j=0}^{N-1} V_{j(k)} \phi_{ij} \cdot 2^k \quad (9)$$

$$= \sum_{j=0}^{N-1} V_{j(P)} \phi_{ij} \cdot 2^P + \sum_{j=0}^{N-1} V_{j(P+1)} \phi_{ij} \cdot 2^{P+1} +$$

$$\cdots + \sum_{j=0}^{N-1} V_{j(M)} \phi_{ij} \cdot 2^M$$

In the ROM-based processor using a DA algorithm, all row vectors of transform matrix can be individually multiplied by all binary vectors with the same length. These multiplication results are stored in individual ROMs addressed by the corresponding binary vectors in advance. Therefore, an input vector ready for DCT or IDCT can be divided into a plurality of binary component vectors with incremental powers. These binary component vectors sequentially address the stored ROMs to acquire the corresponding data. According to the powers of these binary component vectors, the acquired corresponding data are shifted and added with each other to obtain an output vector, like equation (9).

Figure 1:
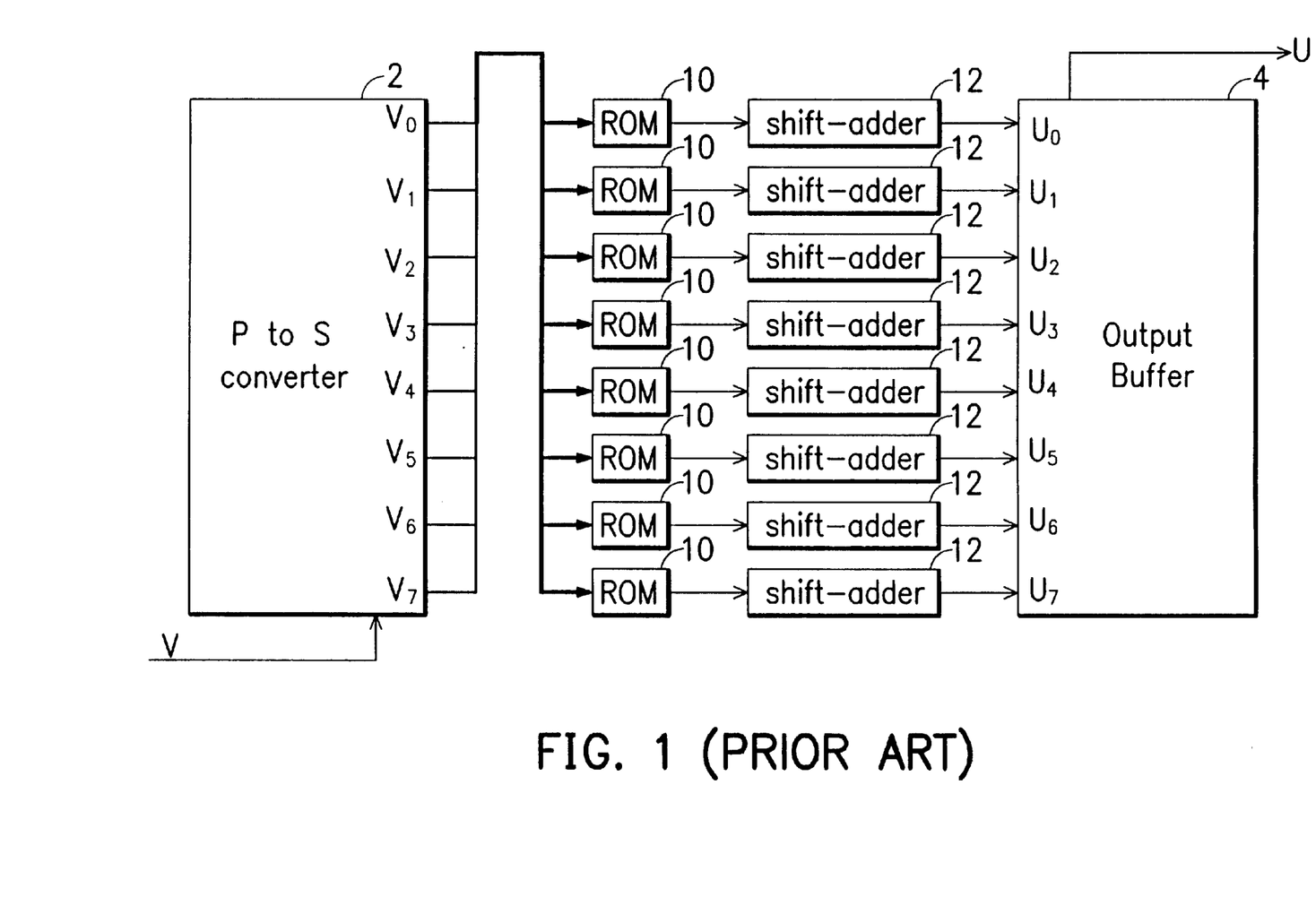
FIG. 1 (Prior Art) is a block diagram of the conventional ROM-based DCT processor.

FIG. 1 (Prior Art) is a block diagram of the conventional ROM-based DCT processor. Input vector V, which includes eight terms $V_0, V_1, \ldots, V_7$, is supplied to parallel-to-serial converter 2. All terms of input vector V are individually supplied but all bits of each term are supplied together. After parallel-to-serial conversion, the same bits of all terms, $V_{j(k)}$ (j=0 to 7) in equation (9), are simultaneously fed into ROMs 10 and serve as addressing data to fetch the corresponding data stored in advance. In this case, each of ROMs 10 has at least 256 memory cells corresponding to $2^8$ situations. Fetched data from each of ROMs 20 are sequentially fed into the corresponding shift-adder 12. Shift-adders 12 can recursively compute the vector terms $U_0$ to $U_7$ by these fetched data, according to equation (9). Finally, output buffer 4 collects all bits of output vector terms $U_0, U_1, \ldots, U_7$, and then individually outputs these terms as output vector U. The structure of the DCT processor in FIG. 1 is also applicable to an IDCT processor, unless the data stored in ROMs 10 must match with the transform matrix of IDCT.

Figure 2:
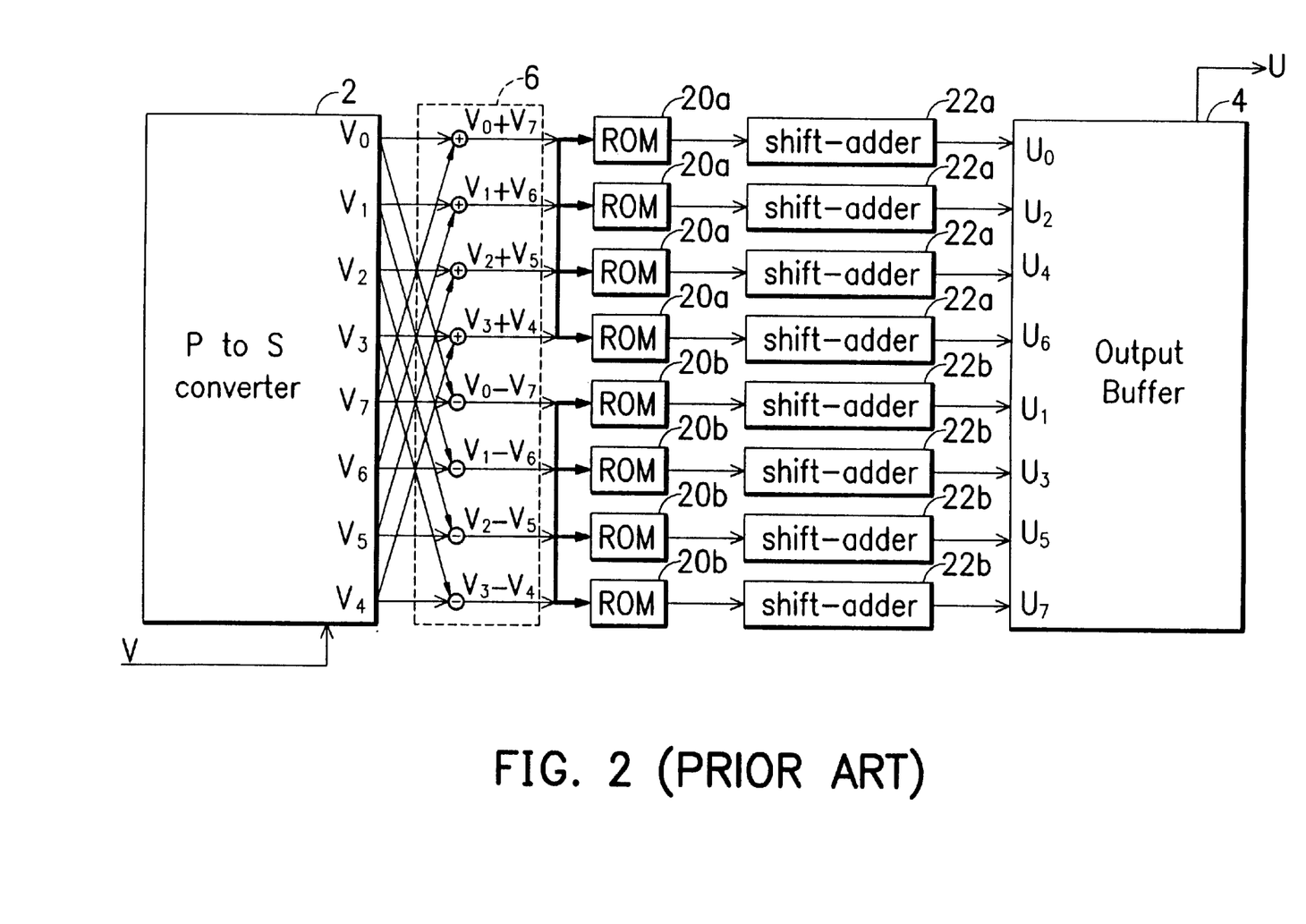
FIG. 2 (Prior Art) is a block diagram of the conventional ROM-based reduced DCT processor.

FIG. 2 (Prior Art) is a block diagram of the conventional ROM-based reduced DCT processor, which is similar to that in FIG. 1. Pre-processing device 6 adds the opposing two terms ($V_0$ and $V_7$, $V_1$ and $V_6$, $V_2$ and $V_5$, $V_3$ and $V_4$) to generate four addition quantities in equation (3). In the same way, pre-processing device 6 subtracts the opposing two terms to generate four subtraction quantities in equation (4). According to matrix $\phi'$ in equation (3) and matrix $\phi''$ in equation (4), required data are respectively stored in ROMs 20a and ROMs 20b in advance. Addition quantities $V_0+V_7$, $V_1+V_6$, $V_2+V_5$, and $V_3+V_4$ are fed into ROMs 20a and the following shift-adders 22a to produce the even terms $U_0$, $U_2$, $U_4$, and $U_6$ of output vector U, like the FIG. 1 processor. At the same time, subtraction quantities $V_0-V_7$, $V_1-V_6$, $V_2-V_5$, and $V_3-V_4$ are fed into ROMs 20b and the following shift-adders 22b to produce the odd terms $U_1$, $U_3$, $U_5$, and $U_7$ of output vector U. Finally, output buffer 4 collects all bits of output vector terms $U_0, U_1, \ldots, U_7$, and then individually outputs these terms as output vector U.

Figure 3:
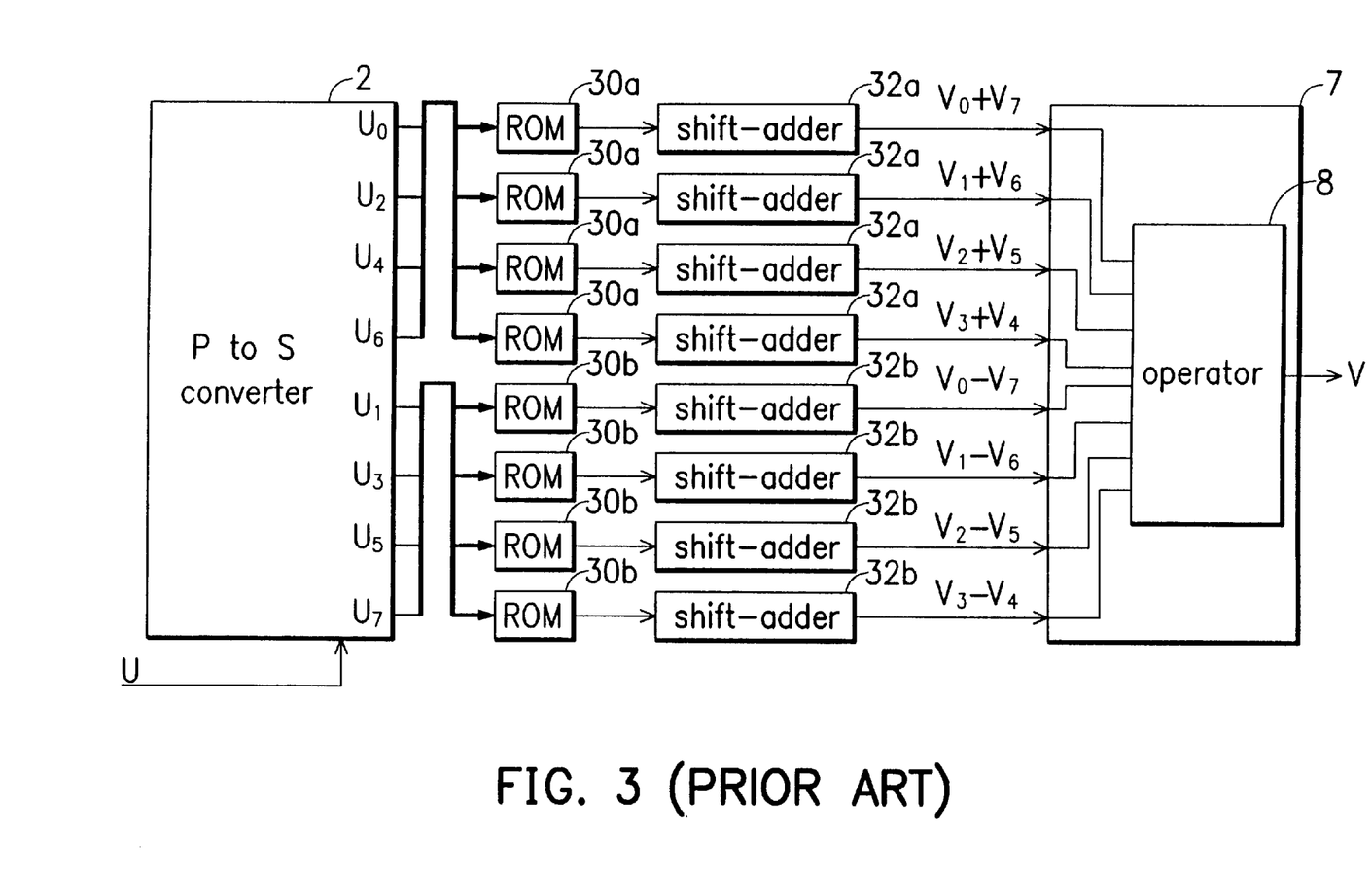
FIG. 3 (Prior Art) is a block diagram of the conventional ROM-based reduced IDCT processor.

FIG. 3 (Prior Art) is a block diagram of the conventional ROM-based reduced IDCT processor. All terms of input vector U are divided into even terms ($U_0$, $U_2$, $U_4$, and $U_6$) and odd terms ($U_1$, $U_3$, $U_5$, and $U_7$). According to equation (5), the even terms of input vector U are fed into ROMs 30a and the following shift-adders 32a to produce the corresponding addition quantities $V_0+V_7$, $V_1+V_6$, $V_2+V_5$, and $V_3+V_4$. At the same time, the odd terms of input vector U are fed into ROMs 30b and the following shift-adders 32b to produce the corresponding subtraction quantities $V_0-V_7$, $V_1-V_6$, $V_2-V_5$, and $V_3-V_4$, according to equation (6). Output buffer 4 is used to collect all bits of these addition quantities and subtraction quantities and output them together. Finally, operator 8 is used to calculate all terms of output vector V by adding or subtracting the addition quantities by the corresponding subtraction quantities, for example, $V_0+V_7$ and $V_0-V_7$, and dividing them by 2.

The transformation scheme used in the ROM-based DCT/IDCT processor can easily be implemented. However, its main drawback is that it requires a large amount of chip area to implement ROMs. In addition, there is a timing bottleneck while addressing these ROMs. The computation speed is inevitably degraded.

SUMMARY OF THE INVENTION

Under such circumstances, one object of the present invention is to provide a DCT/IDCT processor with a simple structure to reduce the fabrication cost.

Another object of the present invention is to provide a DCT/IDCT processor which requires fewer transistors and less chip area.

A further object of the present invention is to provide a DCT/IDCT processor which can operate at a higher speed than those of the prior art.

According to these objects, the present invention provides a DCT/IDCT processor receiving an N-term input vector, where N is a positive integer. It includes a matrix summation means and R shift-adding means. The matrix summation means computes R N-term binary vectors by the input vector, respectively for each term of an output vector, where R is a positive integer. The same terms of the R binary vectors constitute a sum of at least two selected from the group of N terms of the input vector and zero in binary form. The N shift-adding means respectively compute the N terms of the output vector by sequentially left-shifting and adding the corresponding R N-term binary vectors.

In addition, the present invention provides a reduced DCT processor receiving an N-term input vector, which includes:

a pre-processing means for computing N/2 addition quantities and N/2 subtraction quantities by adding and subtracting two opposing terms of the N-term input vector;

a first matrix summation means for computing R N/2-term first binary vectors by the addition quantities, respectively for each even term of the output vector, wherein the same terms of the R first binary vectors for each even term of the output vector constitute a sum of at least two selected from the group of the N/2 addition quantities and zero in binary form, and R is a positive integer;

a second matrix summation means for computing R N/2-term second binary vectors by the subtraction quantities, respectively for each odd term of the output vector, wherein the same terms of the R second binary vectors for each odd term of the output vector constitute a sum of at least two selected from the group of the N/2 subtraction quantities and zero in binary form;

N shift-adding means for respectively computing the even terms of the output vector by sequentially left-shifting and adding the corresponding R first binary vectors, and computing the odd terms of the output vector by sequentially left-shifting and adding the corresponding R second binary vectors.

In addition, the present invention provides a reduced IDCT processor receiving an N-term input vector, which includes:

a first matrix summation means for computing R N/2-term first binary vectors by even terms of the input vector, respectively for each addition quantity derived by adding the opposing terms of the output vector, wherein the same terms of the R first binary vectors for each addition quantity of the output vector constitute a sum of at least two selected from the group of the N/2 even terms of the input vector and zero in binary;

a second matrix summation means for computing R N/2-term first binary vectors by odd terms of the input vector, respectively for each subtraction quantity derived by subtracting the opposing terms of the output vector, wherein the same terms of the R first binary vectors for each subtraction quantity of the output vector constitute a sum of at least two selected from the group of the N/2 odd terms of the input vector and zero in binary form;

N shift-adding means for respectively computing the N/2 addition quantities of the output vector by sequentially left-shifting and adding the R first binary vectors, and computing N/2 subtraction quantities of the output vector by sequentially left-shifting and adding the R second binary vectors; and a post-processing means for computing the N terms of the output vector by adding and subtracting the corresponding pairs of the N/2 addition quantities and the N/2 subtraction quantities and dividing the results by 2.

Each of the matrix summation means includes:

a plurality of adders for sequentially computing the R binary vectors; and a latch for synchronizing all terms of each of the R binary vectors and respectively outputting to the corresponding shift-adding means.

Each of the adders of the matrix summation means includes:

a full adder for receiving two input bits and an input carry bit, and outputting a sum bit and an output carry bit; and means for temporarily storing the output carry bit and then generating the input carry bit.

Each of the shift-adders includes:

a multi-bit adder for sequentially receiving the R binary vectors at its one input;

a multi-bit latch for temporarily storing a sum vector of the multi-bit adder; and means for shifting an output of the multi-bit latch by adding a least significant bit to apply to the other input of the multi-bit adder.

BRIEF DESCRIPTION OF THE DRAWINGS

The detailed description of an embodiment of the present invention is made with reference to the accompanying drawings, wherein.

DETAILED DESCRIPTION OF THE PREFERRED EMBODIMENTS

Compared with the conventional DCT and IDCT processors based on ROMs, adder and multiplier combinations, or other logic architectures, the processor disclosed in this embodiment of the present invention is based on adders. The required circuitry for implementation in this embodiment is much easier than that of the conventional ones. The DCT and IDCT processors described as below handle 8-point discrete cosine transform and inverse discrete cosine transform. To the skilled in the art, however, the scheme of performing this DCT/IDCT operation can easily be applied to other comparable cases with different points.

As stated in the prior art, equations (1) and (2) are capable of handling the DCT operation and the IDCT operation, respectively. In addition, equations (3) and (4), that are derived by equation (1), can handle the DCT operation only. Equations (5) and (6), that are derived by equation (2), can handle the IDCT operation only. For clarity, hereafter we refer to the operations relating to equation (1) as DCT, those relating to equation (2) as IDCT, those relating to equations (3) and (4) as reduced DCT, and those relating to equations (5) and (6) as reduced IDCT. It should be noted that these equations can readily be modified and then applied to the other cases with different points. According to the general case of equation (1), for example, the i-th term $U_i$ of vector U can be expressed as:

$$U_i = \sum_{j=0}^{N-1} \phi_{ij} V_j \tag{10}$$

where $\phi_{ij}$ is the term in the i-th row and the j-th column of transform matrix $\Phi$; $V_j$ is the j-th term of vector V; and $0 \leq i, j \leq N-1$.

There is an important difference between equation (10) and equation (7). Transform matrix term $\phi_{ij}$ is a known quantity and can be obtained from general N-point DCT. This quantity, therefore, should be capable of being expressed as a series of bits ZERO and ONE in binary form. Therefore, the transform matrix term $\phi_{ij}$ can be expressed by power series of 2 as:

$$\phi_{i,j} = \sum_{k=P}^{M} \phi_{ij(k)} \cdot 2^k \qquad (11)$$

where P and M are integers and $P \leq M$; and $\phi_{ij(k)}$ is the coefficient of the $2^k$ term, either ONE or ZERO.

According to equation (10) and (11), vector term $U_i$ can be derived as:

$$U_i = \sum_{j=0}^{N-1} \left( \sum_{k=P}^{M} \phi_{ij(k)} \cdot 2^k \right) V_j = \sum_{k=P}^{M} \sum_{j=0}^{N-1} \phi_{ij(k)} V_j \cdot 2^k \qquad (12)$$

$$= \sum_{j=0}^{N-1} \phi_{ij(P)} V_j \cdot 2^P + \sum_{j=0}^{N-1} \phi_{ij(P+1)} V_j \cdot 2^{P+1} +$$

$$\cdots + \sum_{j=0}^{N-1} \phi_{ij(M-1)} V_j \cdot 2^{M-1} + \sum_{j=0}^{N-1} \phi_{ij(M)} V_j \cdot 2^M$$

In equation (12), each power coefficient $$\left( \sum_{j=0}^{N-1} \phi_{ij(k)} V_j \right)$$

represents a summation of vector terms $V_j$. Owing to that $\phi_{ij(k)}$ is ONE or ZERO, the power coefficient could be a sum of at least two quantities selected from the group of vector terms $V_j$ and zero in binary form. Since $\phi_{ij(k)}$ is known, the summation formula for each power coefficient is also known. The direct method of calculating vector term $U_i$ is to calculate the required summations of vector terms $V_j$ and then to shift and add them in order according to equation (12). Since the summation of vector terms $V_j$ still requires a lot of hardware to implement, calculation for vector term $U_i$ should be further simplified.

Vector term $V_j$ can be expressed as a series of bits in binary system, similar to equation (8). It is clear that we can establish a hardware including 1-bit adders, which can in order calculate each bit of the summation $$\sum_{j=0}^{N-1} \phi_{ij(k)} V_j$$

by the corresponding bit of vector term $V_j$ in the same time interval, to obtain the summation $$\sum_{j=0}^{N-1} \phi_{ij(k)} V_j.$$

For clarity, we define:

$$\Theta_{ik} \equiv \sum_{j=0}^{N-1} \phi_{ij(k)} V_j, k = P \cdots M; P \leq M \qquad (13)$$

In t-th time interval, for example, the hardware including 1-bit adders receives a t-th bit $V_{j(t)}$ of $V_j$ and generates a t-th bit $\Theta_{ik(t)}$ of $\Theta_{ik}$, which can be expressed as:

$$\Theta_{ik} = \sum_{t=P}^{L} \Theta_{ik(t)} \cdot 2^t, P \leq L \qquad (14)$$

According to equations (12) and (14), vector term $U_i$ can be obtained by:

$$U_i = \sum_{k=P}^{M} \Theta_{ik} \cdot 2^k = \sum_{k=P}^{M} \left[ \sum_{t=P}^{L} \Theta_{ik(t)} \cdot 2^t \right] \cdot 2^k = \sum_{t=P}^{L} \left[ \sum_{k=P}^{M} \Theta_{ik(t)} \cdot 2^k \right] \cdot 2^t \qquad (15)$$

$\Theta_{ik(t)}$ can be ONE or ZERO. Note that such a calculation scheme also can be applied to equations (2) to (6).

EXAMPLE

Now the scheme of calculating the term $V_0+V_7$ in equation (5) is described as below to illustrate the fundamental principles of the present invention. According to equation (5), vector term $V_0+V_7$ can be expressed as:

$$V_0+V_7=0.7071 \cdot U_0+0.9239 \cdot U_2+0.7071 \cdot U_4+0.3847 \cdot U_6 \qquad (16)$$

By expressing all coefficients in binary form, equation (16) is converted into:

$$V_0 + V_7 = 0.101101010000010_b \cdot U_0 \qquad (17)$$
$$= 0.111011001000010_b \cdot U_2$$
$$= 0.101101010000010_b \cdot U_4$$
$$= 0.011000011111100_b \cdot U_6$$

According to equation (12), vector term $V_0+V_7$ shown in equation (17) can be:

$$V_0 + V_7 = \qquad (18)$$

$$\begin{bmatrix} 1 \\ 1 \\ 1 \\ 0 \end{bmatrix}^T \begin{bmatrix} U_0 \\ U_2 \\ U_4 \\ U_6 \end{bmatrix} \cdot 2^{-1} + \begin{bmatrix} 0 \\ 1 \\ 0 \\ 1 \end{bmatrix}^T \begin{bmatrix} U_0 \\ U_2 \\ U_4 \\ U_6 \end{bmatrix} \cdot 2^{-2} + \begin{bmatrix} 1 \\ 1 \\ 1 \\ 1 \end{bmatrix}^T \begin{bmatrix} U_0 \\ U_2 \\ U_4 \\ U_6 \end{bmatrix} \cdot 2^{-3} + \cdots +$$

$$\begin{bmatrix} 1 \\ 1 \\ 1 \\ 0 \end{bmatrix}^T \begin{bmatrix} U_0 \\ U_2 \\ U_4 \\ U_6 \end{bmatrix} \cdot 2^{-14} = (U_0 + U_2 + U_4) \cdot 2^{-1} + (U_2 + U_6) \cdot 2^{-2} +$$

$$(U_0 + U_2 + U_4 + U_6) \cdot 2^{-3} + \cdots + (U_0 + U_2 + U_4) \cdot 2^{-14}$$

The summation of vector terms $U_i$ in equation (18) is defined as:

$$U_{024} \equiv U_0+U_2+U_4 \qquad (19a)$$

$$U_{26} \equiv U_2+U_6 \qquad (19b)$$

$$U_{0246} \equiv U_0+U_2+U_4+U_6 \qquad (19c)$$

and so on. According to equation (14), the summation $U_{024}$, $U_{26}$, $U_{0246}$ in binary form can be expressed as:

$$U_{024} = \sum_{t=0}^{15} U_{024(L)} 2^{t-14} \quad (20a)$$

$$U_{26} = \sum_{t=0}^{15} U_{26(t)} 2^{t-14} \quad (20b)$$

$$U_{0246} = \sum_{t=0}^{15} U_{0246(t)} 2^{t-14} \quad (20c)$$

Therefore, equation (18) can be further derived as:

$$V_0 + V_7 = U_{024} \cdot 2^{-1} + U_{26} \cdot 2^{-2} + U_{0246} \cdot 2^{-3} + \cdots + U_{024} \cdot 2^{-14} = \quad (21)$$

$$\sum_{t=0}^{15} U_{024(t)} 2^{t-14} \cdot 2^{-1} + \sum_{t=0}^{15} U_{26(t)} 2^{t-14} \cdot 2^{-2} +$$

$$\sum_{t=0}^{15} U_{0246(t)} 2^{t-14} \cdot 2^{-3} + \cdots + \sum_{t=0}^{15} U_{024} 2^{t-14} \cdot 2^{-14} =$$

$$\sum_{t=0}^{15} [U_{024(t)} 2^{-1} + U_{26(t)} 2^{-2} + U_{0246(t)} 2^{-3} +$$

$$\cdots + U_{024(t)} 2^{-14}] \cdot 2^{t-14}$$

It is convenient to implement equation (21) by hardware.

EMBODIMENT 1

Figure 4:
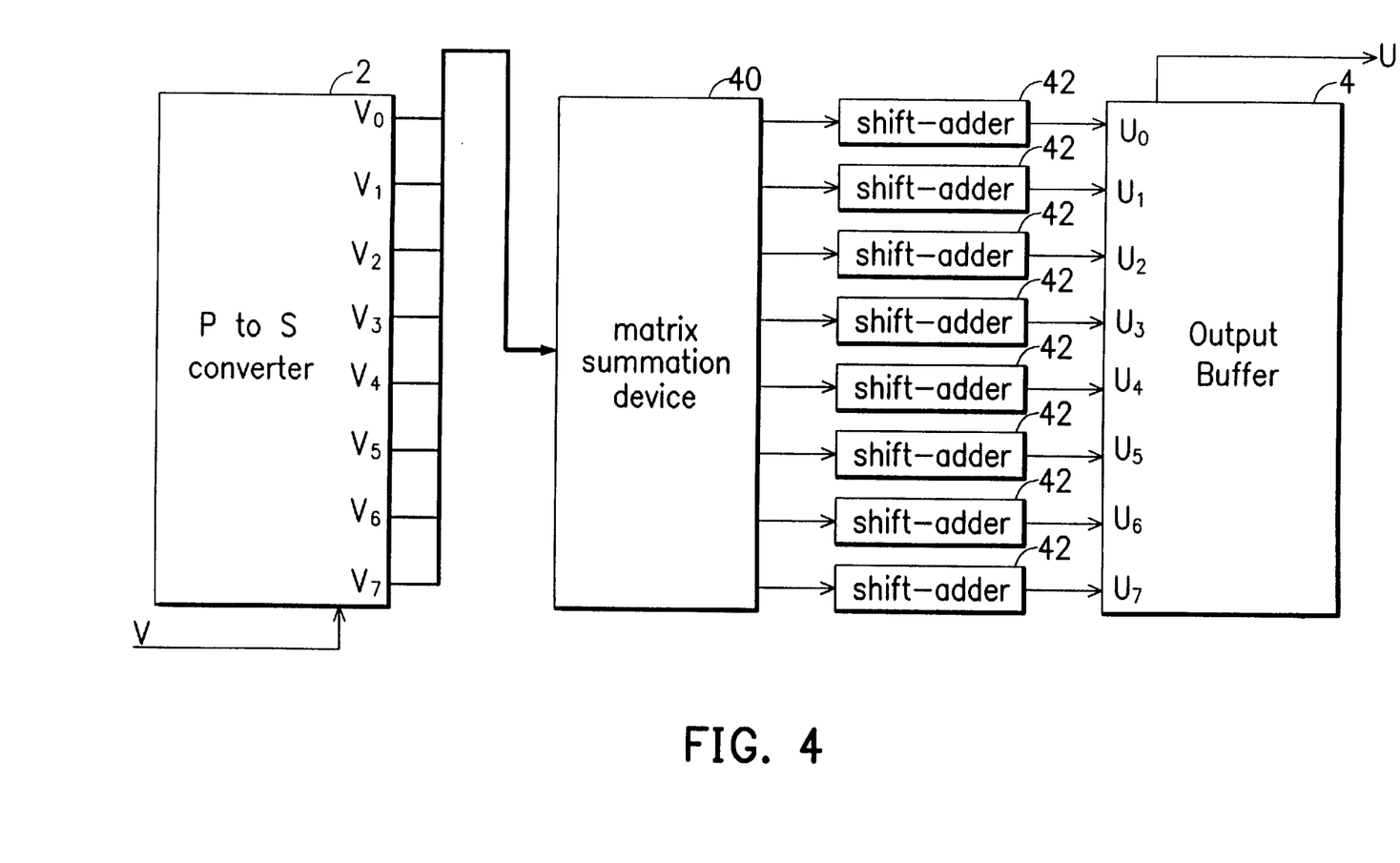
FIG. 4 is a block diagram of the adder-based DCT processor according to the present invention.

Referring to the above discussion, appropriate implementation of computing DCT and IDCT in the present invention is illustrated as follows. FIG. 4 is a block diagram of an 8-point, adder-based DCT processor according to the present invention. Note that the structure shown in FIG. 4 is also appropriate to an 8-point IDCT processor. Input vector V, which includes eight terms $V_0, V_1, \ldots, V_7$, is supplied to parallel-to-serial converter 2. All terms of input vector V are individually supplied but all bits of each term are supplied together. After parallel-to-serial convertion, the same bits of all terms are simultaneously fed to matrix summation means 40.

Turning to equation (15), each vector term $U_i$ can be obtained by left-shifting and adding R summation values $$\sum_{k=P}^{M} \Theta_{ik(t)} \cdot 2^k,$$

where R=L−P+1. Output vector U can be readily obtained by computing all the eight vector terms $U_i$ (i=0–7). It is clear that overall computation before shifting and adding can be viewed as computation of R N-term binary vectors, where N is the term number of input vector V and R is the bit number of each term of input vector V. The same terms of the R binary vectors constitute a sum of at least two selected from the group of the N terms of input vector V and zero in binary form, determined by equation (9). The first bits of all R binary vectors are used for calculating the output vector term $U_0$, the second bits of all R binary vectors are used for calculating the output vector term $U_1$, and so on.

In this embodiment, matrix summation device 40 generates R N-term binary vectors, respectively for each term of output vector U. Then each of the R binary vectors from matrix summation device 40 can be sequentially supplied to the corresponding shift-adder 42 to complete the computation of the operation $$\sum_{t=P}^{L} [ \cdots ] \cdot 2^t$$

in equation (15). Finally, output buffer 4 collects all bits of output vector terms $U_0, U_1, \ldots, U_7$, and then individually outputs these terms as output vector U. It should be noted that the computation in this embodiment is bit by bit, not step by step. The concurrent process of the present invention can upgrade the operation speed.

EMBODIMENT 2

Figure 5:
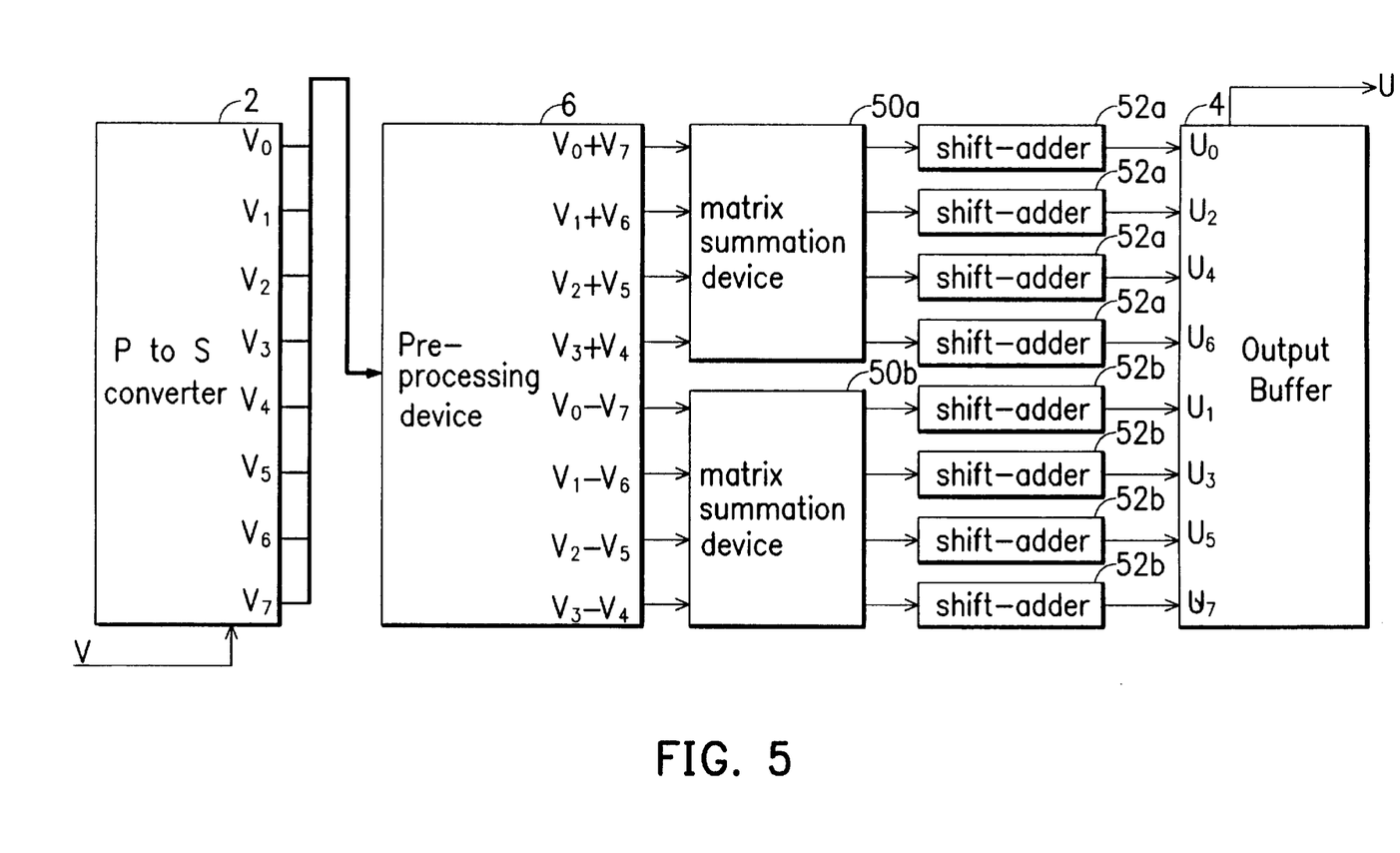
FIG. 5 is a block diagram of the adder-based reduced DCT processor according to the present invention.

FIG. 5 is a block diagram of an 8-point, adder-based reduced DCT processor. This scheme of computing DCT is based on equations (3) and (4). Input vector V is fed into parallel-to-serial converter 2, to convert its data form as Embodiment 1. In comparison with Embodiment 1, all terms $V_0, V_1, \ldots, V_7$ of input vector V in this embodiment are first fed into pre-processing device 6. Pre-processing device 6 adds two opposing terms of input vector V to generate addition quantities $V_0+V_7, V_1+V_6, V_2+V_5$, and $V_3+V_4$, and subtracts two opposing terms of input vector V to generate subtraction quantities $V_0-V_7, V_1-V_6, V_2-V_5$, and $V_3-V_4$. One first matrix summation means 50a and four shift adders 52a use these addition quantities to generate even terms $U_0, U_2, U_4$, and $U_6$ of output vector U, according to equation (3) and the same scheme as Embodiment 1. In addition, another second matrix summation device 50b and four shift-adders 52b use these subtraction quantities to generate odd terms $U_1, U_3, U_5$, and $U_7$ of output vector U, according to equation (4) and the same scheme as Embodiment 1. Finally, output buffer 4 collects all bits of output vector terms $U_0, U_1, \ldots, U_7$, and then individually outputs these terms as output vector U.

EMBODIMENT 3

Figure 6:
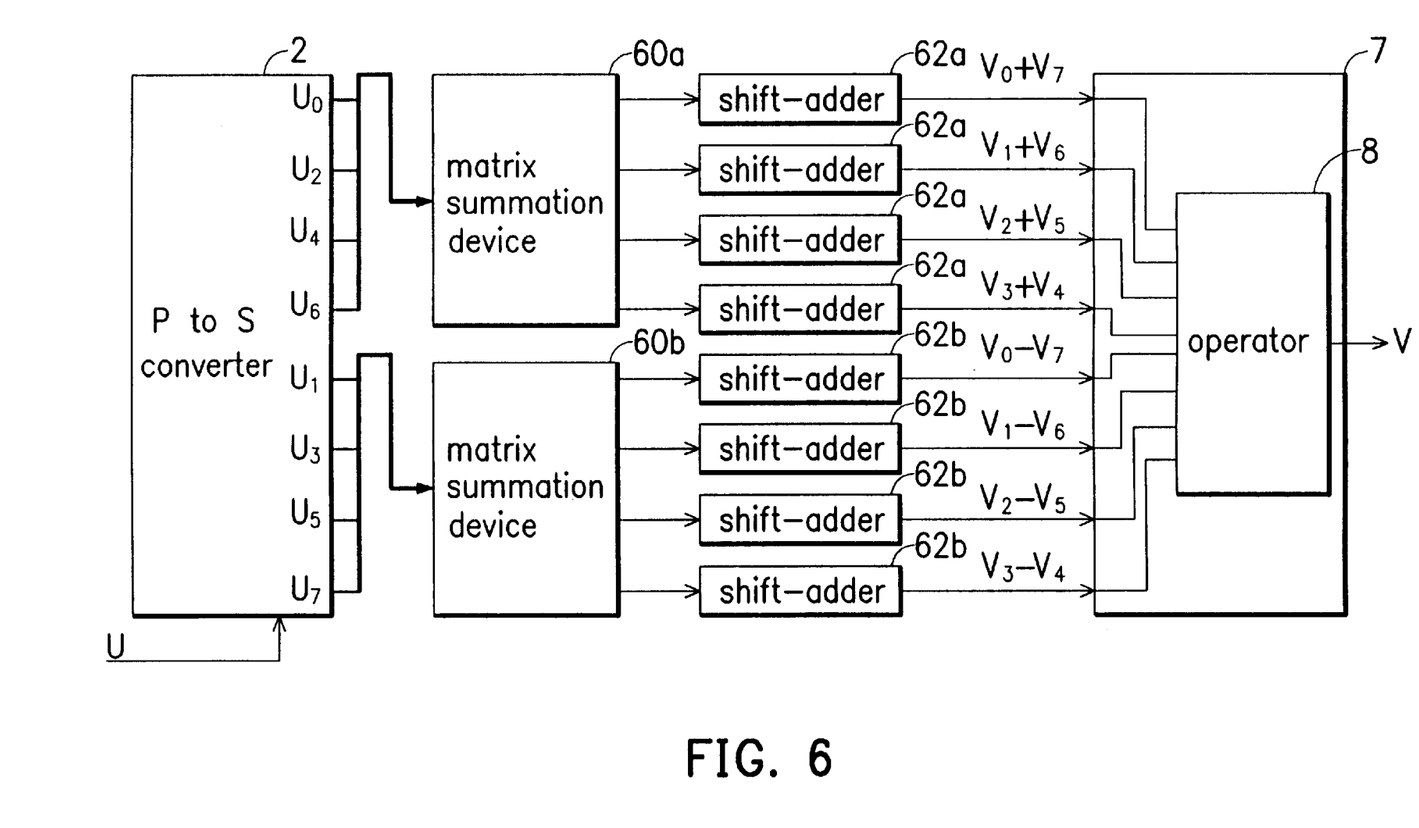
FIG. 6 is a block diagram of the adder-based reduced IDCT processor according to the present invention.

FIG. 6 is a block diagram of an 8-point, adder-based reduced IDCT processor. The scheme of computing IDCT is based on equations (5) and (6). The IDCT processor shown in FIG. 6 first converts the data form of input vector U in the parallel-to-serial converter 2, as Embodiment 1 and Embodiment 2 do. Then all terms of input vector U can be divided into two groups: even terms ($U_0, U_2, U_4, U_6$) and odd terms ($U_1, U_3, U_5, U_7$), for respective processing. One first matrix summation device 60a receives the even terms of input vector U, and the first matrix summation device 60a and four shift-adders 62a generate addition quantities $V_0+V_7, V_1+V_6, V_2+V_5$, and $V_3+V_4$, according to equation (5) and the same scheme as Embodiment 1. In addition, another second matrix summation device 60b receives the odd terms of input vector U, and the second matrix summation device 60b and four shift-adders 62b generate subtraction quantities $V_0-V_7, V_1+V_6, V_2-V_5$, and $V_3-V_4$, according to equation (6) and the same computational scheme as Embodiment 1. Post-processor 7 collects all bits of the addition quantities and the subtraction quantities and outputs them individually. To acquire all terms of output vector V, operator 8 can add and subtract, for example, addition quantity $V_0 30 V_7$ and subtraction quantity $V_0-V_7$, and then divide the result into halves.

Figure 7:
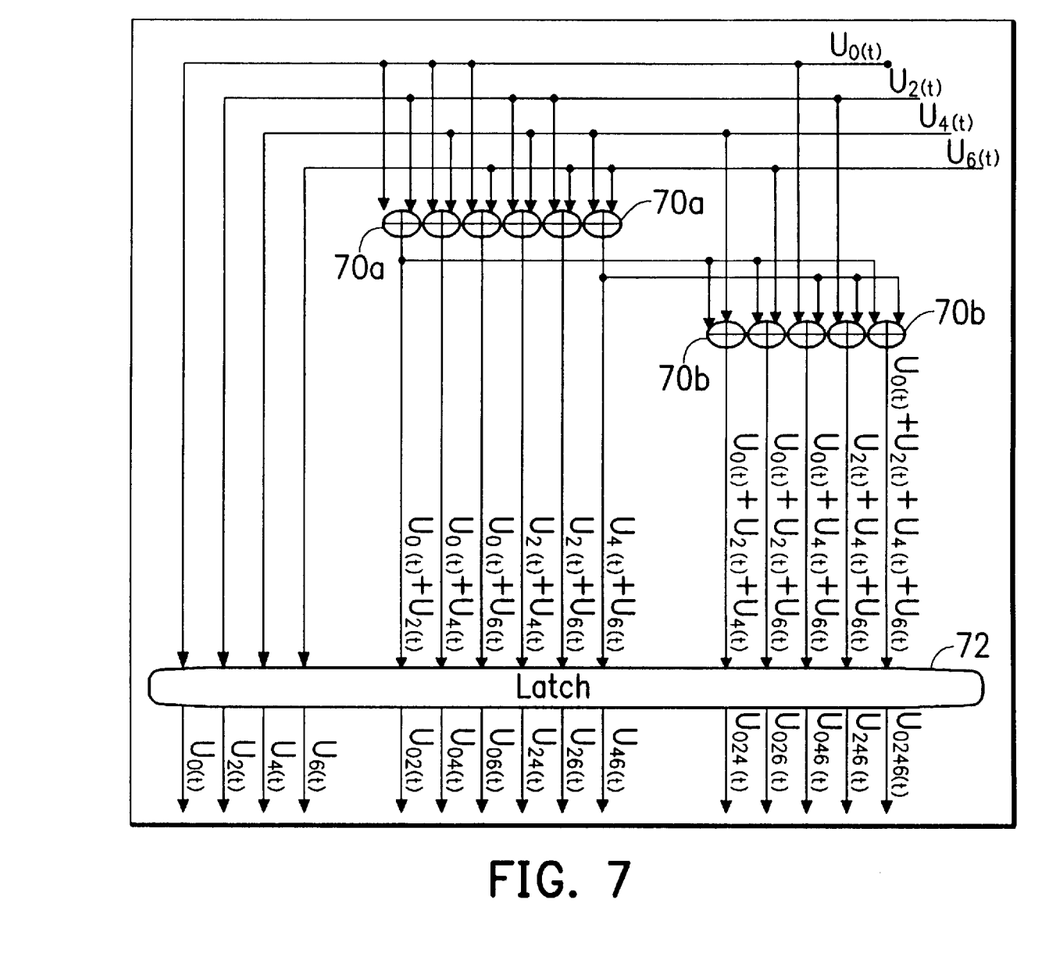
FIG. 7 is a circuit diagram of the matrix summation device in FIG. 6 for generating all sums of vector terms $U_{i(e)}$ (i=0,2,4,6)
Figure 8:
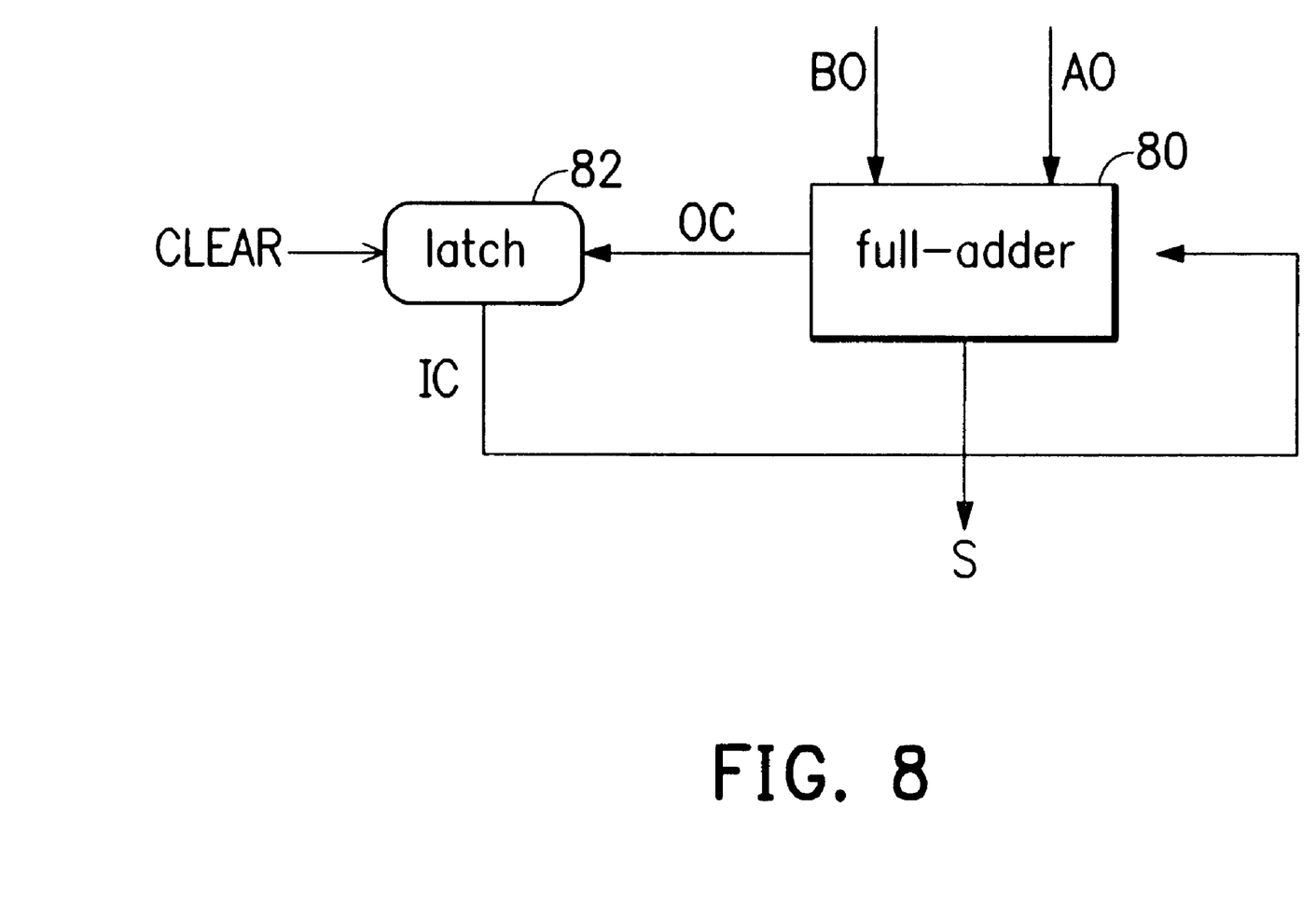
FIG. 8 illustrates an example of a 1-bit adder that can be used in FIG. 7.

Circuits for the FIG. 4, FIG. 5, and FIG. 6 DCT/IDCT processors are described as follows. The parallel-to-serial converters, output buffers, the pre- and post-processors, and operators in these embodiments are the same components as those of the prior art. The following discussion will concentrate on the implementation of matrix summation devices and shift-adders. Referring to the above-mentioned Example, FIG. 7 to FIG. 8 illustrate the implementation of the first matrix summation device 60a in FIG. 6. FIG. 7 is a circuit diagram of matrix summation device 60a generating all sums of vector terms $U_{i(t)}$ (i=0,2,4,6). That is, such a circuit is used to calculate all possibilities of the amount $\Theta_{ik(t)}$ in equation (15), which is denoted as $U_{0(t)}$, $U_{02(t)}$, $U_{024(t)}$, $U_{0246(t)}$ in equation (19). In this embodiment, 1-bit adders 70a add two of even vector terms ($U_{0(t)}$, $U_{2(t)}$, $U_{4(t)}$, and $U_{6(t)}$) to generate the sums $U_{02(t)}$, $U_{04(t)}$, $U_{06(t)}$, $U_{24(t)}$, $U_{26(t)}$, and $U_{46(t)}$. Furthermore, the left four of 1-bit adders 70b add one of vector terms ($U_{0(t)}$, $U_2(t)$, $U_{4(t)}$, $U_{6(t)}$) with one of the outputs of adders 70a to generate the sums $U_{024}(t)$, $U_{026}(t)$, $U_{046(t)}$ and $U_{246(t)}$. The right one of 1-bit adders 70b adds two outputs of 1-bit adders 70a, $U_{0(t)}+U_{2(t)}$ and $U_{4(t)}+U_{6(t)}$, to generate the sum $U_{0246(t)}$. Presume that each of the 1-bit adders has delay time T. The sums from adders 70a will have delay time T and the sums from adders 70b will have delay time 2T. Therefore, these sums are preferably synchronized by latch device 72 before outputting.

FIG. 8 illustrates an example of a 1-bit adder that can be used in FIG. 7 circuit. The 1-bit adder includes a full adder 80 and a 1-bit latch 82. Full adder 80 receives input bits A0 and B0, which represent any input to adders 70a and 70b shown in FIG. 7, and an input carry bit IC, and produces a sum bit S and an output carry bit OC by performing addition. Input carry IC is generated by delaying output carry OC in latch 82 for one clock period, corresponding to the parameter t in equation (21). In addition, latch 82 can be reset by a control signal CLEAR to refresh computation.

Figure 9:
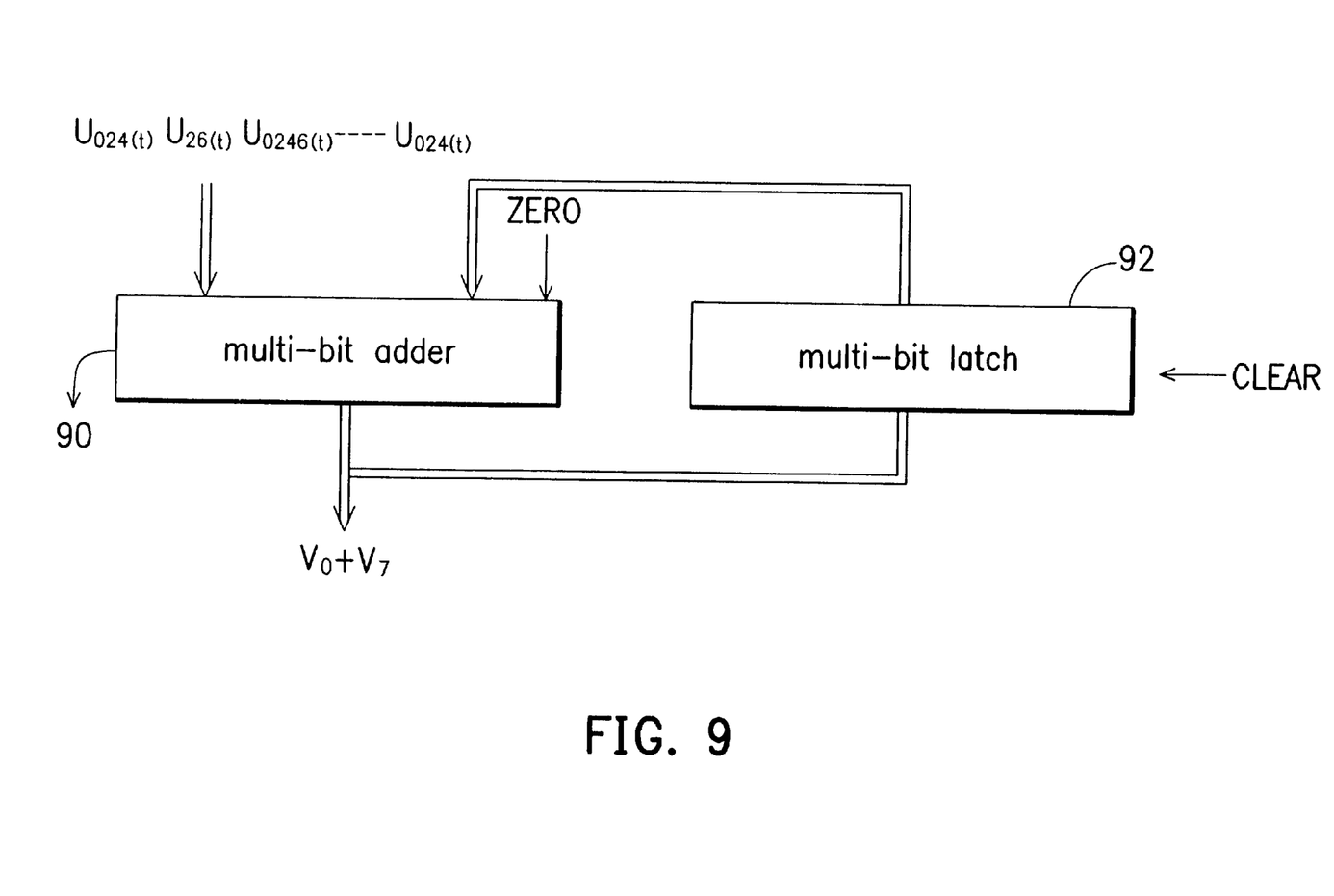
FIG. 9 illustrates a circuit diagram of one of the shift-adders shown in FIG. 6.

FIG. 9 illustrates a circuit diagram of one of shift-adders 62a shown in FIG. 6, which includes a multi-bit adder 90 and a multi-bit latch 92. The shift-adder, calculating the addition quantity $V_0+V_7$, can perform the operation $$\sum_{t=P}^{L} [\cdots] \cdot 2^t$$

in equation (15). Referring to equation (21), the binary number in the bracket [. . . ] is readily obtained by positioning $U_{024(t)}$ to be the fourteenth bit, $U_{26(t)}$ to be the thirteenth bit, $U_{0246(t)}$ to be the twelfth bit, and so on, for each t value. The binary number is one of two inputs of adder 90. The other input of adder 90 is the combination of the output of latch 92 and a bit ZERO as the least significant bit. The output of latch 92 is the previous sum produced by adder 90. As the parameter t increases, adder 90 can recursively add this current binary number and this previous, left-shifted sum. So the addition quantity $V_0+V_7$ can be obtained according to equation (21).

In FIG. 8, the output carry OC produced by adding A0 and B0 is stored in the latch 82 for one clock period. In the next clock period (the parameter t increases by 1), the input carry bit IC, produced by delaying the output carry bit OC for one clock period, will be supplied to full adder 80. Before executing the IDCT operation of the next point, therefore, latch 82 should be reset in advance by the control signal CLEAR. In addition, latch circuit 92 also should be reset by the control signal CLEAR before the next computation process.

Adder and latch circuits are regarded as building blocks for a general digital system and well-known by the skilled in the art. Their detailed circuitry can be found in many textbooks so no further descriptions are necessary here. In addition, the matrix summation device and the shift-adder that are described above can be applied to other embodiments in the present invention, by proper modifications.

Since the major difference between the adder-based processor in the present invention and the conventional ROM-based processor involves the ROMs and the matrix summation devices, in the following discussion, therefore, these two building blocks are compared in many aspects to evaluate their operation performances. Comparisons of the ROMs in FIG. 1 and the matrix summation device in FIG. 4 about the total transistor count, chip area, and delay time, are listed in Table I. The estimation about chip area and speed in the FIG. 1 processor is based on the estimation program released by CCL of ITRI, R.O.C. The estimation about chip area and speed of the matrix summation device in the FIG. 4 processor is achieved by actual auto-routing using CCL 0.8 μm standard cell library.

TABLE I

| Comparison items | Devices needed | Total Tx count | Chip Area | Delay time |
|---|---|---|---|---|
| ROM-based DCT | 8 ROMs, 256 words per ROM, 16 bits per word | about 33,792 | 8.4 mm² | 7.5 ns |
| Adder-based DCT | 44 1-bit serial adders and 44 1-bit flip-flops | about 1,000 | 1.2 mm² | 3.6 ns |

In the same way, comparisons of the ROMs in FIG. 2 or FIG. 3 and the matrix summation devices in FIG. 5 and FIG. 6 are listed in Table II. The environment of these comparisons is as same as that of the previous one.

TABLE II

| Comparison item | Devices needed | Total Tx count | Chip Area | Delay time |
|---|---|---|---|---|
| ROM-based DCT | 8 ROMs, 16 words per ROM, 16 bits per word | about 6,144 | 2.6 mm² | 3.6 ns |
| Adder-based DCT | 2 matrix summation device, 11 1-bit serial adders and 16 1-bit flip-flops per matrix summation device | about 550 | 0.8 mm² | 2.4 ns |

According to Table I and Table II, it is apparent that the adder-based DCT/IDCT processors are superior to the conventional ROM-based processors in all respects. The total transistors required in the matrix summation device are fewer than 1/10 of those in the ROMs. The chip area required in the matrix summation device is less than 1/3 of that in the ROMs. The delay time is also shorter. Since the operation time of the matrix summation device is only a fraction of the operation speed of the system, shortening the delay time of the matrix summation does not mean enormous improvement in the processing speed of DCT/IDCT processors. The improvement of the processing speed, in fact, is minute.

Advantages of the present invention are stated as follows:

1. Since the DCT/IDCT processors disclosed in the present invention is only composed of adders, said processors require fewer transistors and less chip area than those of the prior art. This causes to reduce the fabrication cost.

2. The present DCT/IDCT processors can operate at a higher speed than the prior art. This will increase the performance of an apparatus using this processor.

The foregoing description of preferred embodiments the present invention has been provided for the purposes of illustration and description. It is not intended to be exhaustive or to limit the invention to the precise forms disclosed. Many modifications and variations will be apparent to practitioners skilled in this art. The embodiments were chosen and described to best explain the principles of the invention and its practical application, thereby enabling others skilled in the act to understand the invention for various embodiments and with various modifications as are suited to the particular use contemplated. It is intended that the scope of the invention be defined by the following claims and their equivalents.

What is claimed is:

1. A device for computing discrete cosine transform and inverse discrete cosine transform, which receives an N-term input vector and outputs an N-term output vector, and N is a positive integer, the device comprising:

a matrix summation means for computing for each term of the output vector, R N-term binary vectors from R sets of similarly positioned bits within the N-term input vector and an N-term row of a transform matrix, wherein R is a positive integer representing the number of bits in an input vector term; and N shift-adding means for respectively computing the N terms of the output vector by sequentially left-shifting and adding the corresponding R N-term binary vectors.

2. The device as recited in claim 1, further comprising:

means for converting the input vector to sequentially output the same bits of the N terms of the input vector simultaneously into the matrix summation means; and buffer means for collecting the N terms of the output vector and outputting in order.

3. The device as recited in claim 1, wherein the matrix summation means includes:

a plurality of adders for sequentially computing the R binary vectors for each term of the output vector; and a latch for synchronizing N terms of each of the R binary vectors for each term of the output vector and respectively outputting to the corresponding shift-adding means.

4. The device as recited in claim 3, wherein each of the shift-adding means includes:

a multi-bit adder for sequentially receiving the R binary vectors for the term of the output vector at its one input;

a multi-bit latch for temporarily storing a sum vector of the multi-bit adder; and means for shifting an output of the multi-bit latch by adding a least significant bit to apply to the other input of the multi-bit adder.

5. The device as recited in claim 3, wherein each of the adders comprises:

a full adder for receiving two input bits and an input carry bit, and outputting a sum bit and an output carry bit; and means for temporarily storing the output carry bit and then generating the input carry bit.

6. A device for computing discrete cosine transform, which receives an N-term input vector and outputs an N-term output vector, and N is an even positive integer, the device comprising:

a pre-processing means for computing N/2 addition quantities and N/2 subtraction quantities by adding and subtracting opposing terms of the N-term input vector;

a first matrix summation means for computing for each even term of the output vector, R N/2-term first binary vectors from R sets of similarly positioned bits within the N/2 addition quantities and an N/2-term row of a transform matrix, wherein R is a positive integer representing the number of bits in an addition quantity term;

a second matrix summation means for computing for each odd term of the output vector, R N/2-term second binary vectors from R sets of similarly positioned bits within the N/2 subtraction quantities and an N/2-term row of a transform matrix; and N shift-adding means for respectively computing the even terms of the output vector by sequentially left-shifting and adding the corresponding R first binary vectors, and computing the odd terms of the output vector by sequentially left-shifting and adding the corresponding R second binary vectors.

7. The device as recited in claim 6, further comprising:

means for converting the input vector to sequentially output the same bits of the N terms of the input vector simultaneously into the pre-processing means; and buffer means for collecting the N terms of the output vector and outputting in order.

8. The device as recited in claim 6, wherein the first matrix summation means includes:

a plurality of adders for sequentially computing the R first binary vectors for each even term of the output vector; and a latch for synchronizing N/2 terms of each of the R first binary vectors for each even term of the output vector and respectively outputting to the corresponding shift-adding means.

9. The device as recited in claim 8, wherein each of the adders comprises:

a full adder for receiving two input bits and an input carry bit, and outputting a sum bit and an output carry bit; and means for temporarily storing the output carry bit and then generating the input carry bit.

10. The device as recited in claim 6, wherein the second matrix summation means includes:

a plurality of adders for sequentially computing the R second binary vectors for each odd term of the output vector; and a latch for synchronizing N/2 terms of each of the R second binary vectors for each odd term of the output vector and respectively outputting to the corresponding one of the shift-adding means.

11. The device as recited in claim 10, wherein each of the adders comprises:

a full adder for receiving two input bits and an input carry bit, and outputting a sum bit and an output carry bit; and means for temporarily storing the output carry bit and then generating the input carry bit.

12. The device as recited in claim 6, wherein each of the shift-adding means includes:

a multi-bit adder for sequentially receiving the R binary vectors for the corresponding term of the output vector at its one input;

a multi-bit latch for temporarily storing a sum vector of the multi-bit adder; and means for shifting an output of the multi-bit latch by adding a least significant bit to apply to the other input of the multi-bit adder.

13. A device for computing inverse discrete cosine transform, which receives an N-term input vector and outputs an N-term output vector, and N is an even positive integer, the device comprising:

a first matrix summation means for computing for each addition quantity derived by adding opposing terms of the N-term output vector, R N/2-term first binary vectors from R sets of similarly positioned bits within even terms of the input vector and an N/2 term row of a transform matrix, wherein R is a positive integer representing the number of bits in an input vector term;

a second matrix summation means for computing for each subtraction quantity derived by subtracting opposing terms of the output vector, R N/2-term first binary vectors from R sets of similarly positioned bits within odd terms of the input vector and an N/2-term row of a transform matrix;

N shift-adding means for respectively computing the N/2 addition quantities of the output vector by sequentially left-shifting and adding the R first binary vectors, and computing N/2 subtraction quantities of the output vector by sequentially left-shifting and adding the R second binary vectors; and a post processing means for computing the N terms of the output vector by adding and subtracting the corresponding pairs of the N/2 addition quantities and the N/2 subtraction quantities and dividing the results by 2.

14. The device as recited in claim 13, further comprising:

means for converting the input vector to sequentially output the same bits of the N terms of the input vector simultaneously into the first matrix summation means and the second matrix summation means.

15. The device as recited in claim 13, wherein the first matrix summation means includes:

a plurality of adders for sequentially computing the R first binary vectors for each addition quantity of the output vector; and a latch for synchronizing N/2 terms of each of the R first binary vectors for each addition quantity of the output vector and respectively outputting to the corresponding shift-adding means.

16. The device as recited in claim 15, wherein each of the adders comprises:

a full adder for receiving two input bits and an input carry bit, and outputting a sum bit and an output carry bit; and means for temporarily storing the output carry bit and then generating the input carry bit.

17. The device as recited in claim 13, wherein the second matrix summation means includes:

a plurality of adders for sequentially computing the R second binary vectors for each subtraction quantity of the output vector; and a latch for synchronizing N/2 terms of each of the R second binary vectors for each subtraction quantity of the output vector and respectively outputting to the corresponding shift-adding means.

18. The device as recited in claim 17, wherein each of the adders comprises:

a full adder for receiving two input bits and an input carry bit, and outputting a sum bit and an output carry bit; and means for temporarily storing the output carry bit and then generating the input carry bit.

19. The device as recited in claim 13, wherein each of the shift-adding means includes:

a multi-bit adder for sequentially receiving the R binary vectors for one of the addition quantities and the subtraction quantities of the output vector at its one input;

a multi-bit latch for temporarily storing a sum vector of the multi-bit adder; and means for shifting an output of the multi-bit latch by adding a least significant bit to apply to the other input of the multi-bit adder.

* * * * *